(12) United States Patent
Durham

(10) Patent No.: US 9,132,904 B2
(45) Date of Patent: Sep. 15, 2015

(54) AIR VEHICLE HAVING STRAKES

(71) Applicant: Hybrid Air Vehicles Limited, Bedfordshire (GB)

(72) Inventor: Michael Durham, Buckinghamshire (GB)

(73) Assignee: Hybrid Air Vehicles Limited, Bedfordshire (GB)

( * ) Notice: Subject to any disclaimer, the term of this patent is extended or adjusted under 35 U.S.C. 154(b) by 204 days.

(21) Appl. No.: 13/944,141

(22) Filed: Jul. 17, 2013

(65) Prior Publication Data
US 2014/0021298 A1 Jan. 23, 2014

(30) Foreign Application Priority Data

Jul. 18, 2012 (GB) .................... 1212754.4

(51) Int. Cl.
*B64B 1/02* (2006.01)
*B64B 1/20* (2006.01)

(52) U.S. Cl.
CPC ... *B64B 1/02* (2013.01); *B64B 1/20* (2013.01); *B64B 2201/00* (2013.01)

(58) Field of Classification Search
CPC .............. B64B 1/20; B64B 1/42; B64B 1/58; B64B 1/02; B64B 2201/00
USPC .............................................. 244/30, 123.11
See application file for complete search history.

(56) References Cited

U.S. PATENT DOCUMENTS

| | | | |
|---|---|---|---|
| 1,844,765 A | 2/1932 | Jackson | |
| 2,126,188 A * | 8/1938 | Goetz | 244/30 |
| 3,384,328 A * | 5/1968 | McGee | 244/31 |
| 3,871,603 A * | 3/1975 | Menke et al. | 244/125 |
| 4,326,681 A * | 4/1982 | Eshoo | 244/30 |
| 6,164,589 A | 12/2000 | Kalisz | |
| 7,040,572 B2 * | 5/2006 | Munk | 244/100 R |
| 2003/0001044 A1 | 1/2003 | Munk | |
| 2004/0200927 A1 * | 10/2004 | Swearingen et al. | 244/30 |
| 2006/0084336 A1 * | 4/2006 | Howland et al. | 442/65 |
| 2007/0034740 A1 * | 2/2007 | Li | 244/30 |
| 2007/0069076 A1 * | 3/2007 | Heaven, Jr. | 244/125 |
| 2007/0102570 A1 * | 5/2007 | Luffman | 244/30 |
| 2007/0114326 A1 * | 5/2007 | Gentile | 244/24 |

(Continued)

FOREIGN PATENT DOCUMENTS

| | | |
|---|---|---|
| FR | 2807735 | 10/2001 |
| WO | 0194172 | 12/2001 |

OTHER PUBLICATIONS

European Patent Office, "European Search Report—Application No. EP13177021", Oct. 3, 2014, 2 pages.

(Continued)

*Primary Examiner* — Tien Dinh
*Assistant Examiner* — Alexander V Giczy
(74) *Attorney, Agent, or Firm* — Clement A. Berard, Esq.; Dann, Dorfman, Herrell & Skillman, PC

(57) ABSTRACT

An air vehicle has a gas-filled hull of a flexible sheet material. Strakes extend along an exterior of the hull, each strake comprising a gas-filled tube of a sheet of a flexible sheet material. A rigid board extends outwardly from the gas-filled tube and away from the vehicle. A further sheet of a flexible sheet material extends from one side of the strake over the board to another side of the strake, to provide a strake that is generally triangular in cross section.

18 Claims, 1 Drawing Sheet

(56) References Cited

U.S. PATENT DOCUMENTS

2009/0314880 A1   12/2009  Rawdon
2010/0237192 A1*  9/2010  Sanderson et al. ....... 244/123.11
2013/0068879 A1*  3/2013  Colting .......................... 244/25

OTHER PUBLICATIONS

UK Intellectual Property Office, "Search Report—Application No. GB1212754.4", Nov. 9, 2012, 1 page.

* cited by examiner

AIR VEHICLE HAVING STRAKES

This invention was made with U.S. Government support under the LEMV Agreement (W91260-10-9-0005) awarded by US Army SMDC. The Government has certain rights in this invention.

BACKGROUND TO THE INVENTION

This Application hereby claims the benefit of the priority of Applicant's Great Britain Patent Application No. 1212754.4 filed on Jul. 18, 2012 and entitled "AIR VEHICLE" which is hereby incorporated herein by reference.

This invention relates to an air vehicle, such as a hybrid air vehicle, having a strake.

Published PCT Application WO 2001/094172 describes a hybrid air vehicle having a gas-filled contoured flattened hull and including a pair of longitudinally extending side lobes defining, on the underside of the hull, a longitudinally extending central recess and a payload module received in the central recess. The vehicle lift is partly aerodynamic and partly aerostatic.

The use of low aspect ratio strakes to improve the performance of circular lifting bodies dates back to at least the early 1960's. It is an aim of the invention to provide a strake suitable for an air vehicle, e.g., an airship or hybrid air vehicle, having a hull of flexible sheet material.

SUMMARY OF THE INVENTION

The present invention provides an air vehicle having a gas-filled hull of flexible sheet material, wherein strakes extend along an exterior of the hull, each strake comprising a gas-filled tube of flexible sheet material.

The tube may be filled with air. It may be arranged such that a part of its periphery is provided by the flexible sheet material of the hull of the vehicle.

In embodiments of the invention, a rigid board is provided, projecting outwardly from the gas-filled tube and away from the vehicle, a further layer of flexible sheet material extending from one side of the strake over the board, to another side of the strake, to provide a strake generally triangular in cross section.

The vehicle may be a hybrid air vehicle having a gas-filled contoured flattened hull, and including a pair of longitudinally extending side lobes defining, on the underside of the hull, a longitudinally extending central recess and a payload module received in the central recess. Each strake may extend from the vicinity of a forward motor of the vehicle to the vicinity of a stabilizing fin of the vehicle.

BRIEF DESCRIPTION OF THE DRAWING

The invention will now be describe in more detail, by way of example only, with reference to the accompanying drawings, in which.

DETAILED DESCRIPTION OF PARTICULAR EMBODIMENTS

Figure 1:
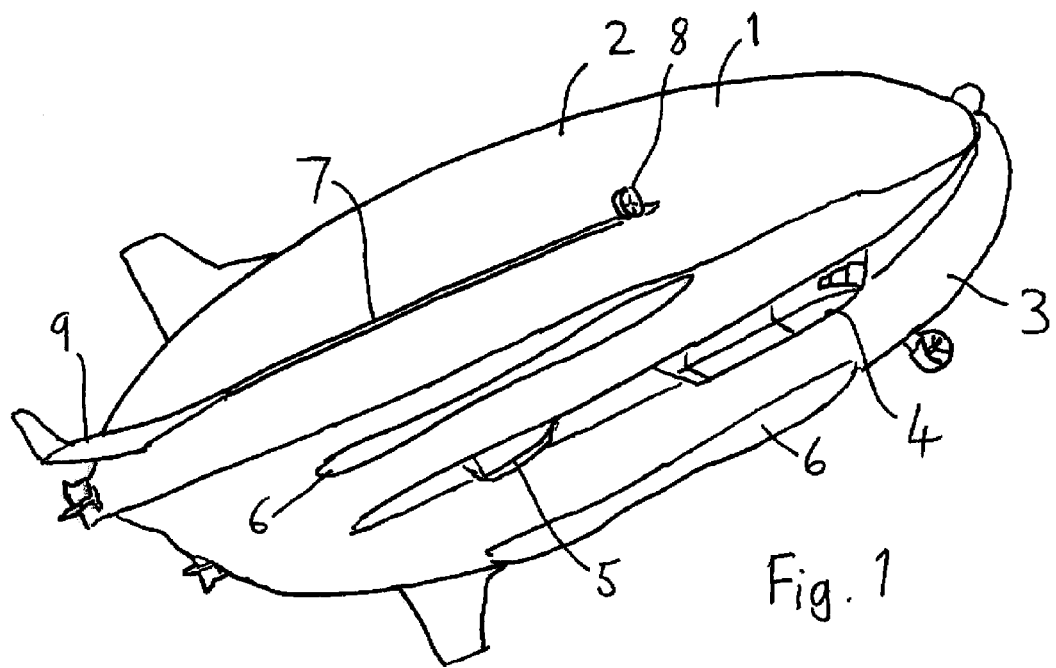
FIG. 1 is a perspective view of a hybrid air vehicle according to an embodiment of the invention.

FIG. 1 shows a hybrid air vehicle having a flattened, generally elliptical cross-section throughout most of its length. The hull 1 of the vehicle is formed of two longitudinally extending side lobes 2 and 3 and has a payload module 4, a fuel module 5 and air cushion landing gear 6.

A strake 7 extends from a vicinity just behind a forward motor 8 to the vicinity of a lower stabilizing fin 9. Typically, there are similar strakes disposed longitudinally on opposite sides of the hull, one on the port side and one on the starboard side, each extending from a respective forward motor 8 toward a respective stabilizing fin 9. Hull 1 is typically contoured and flattened in that the hull has a relatively complex shape in cross section and its width is greater than its height.

Figure 2:
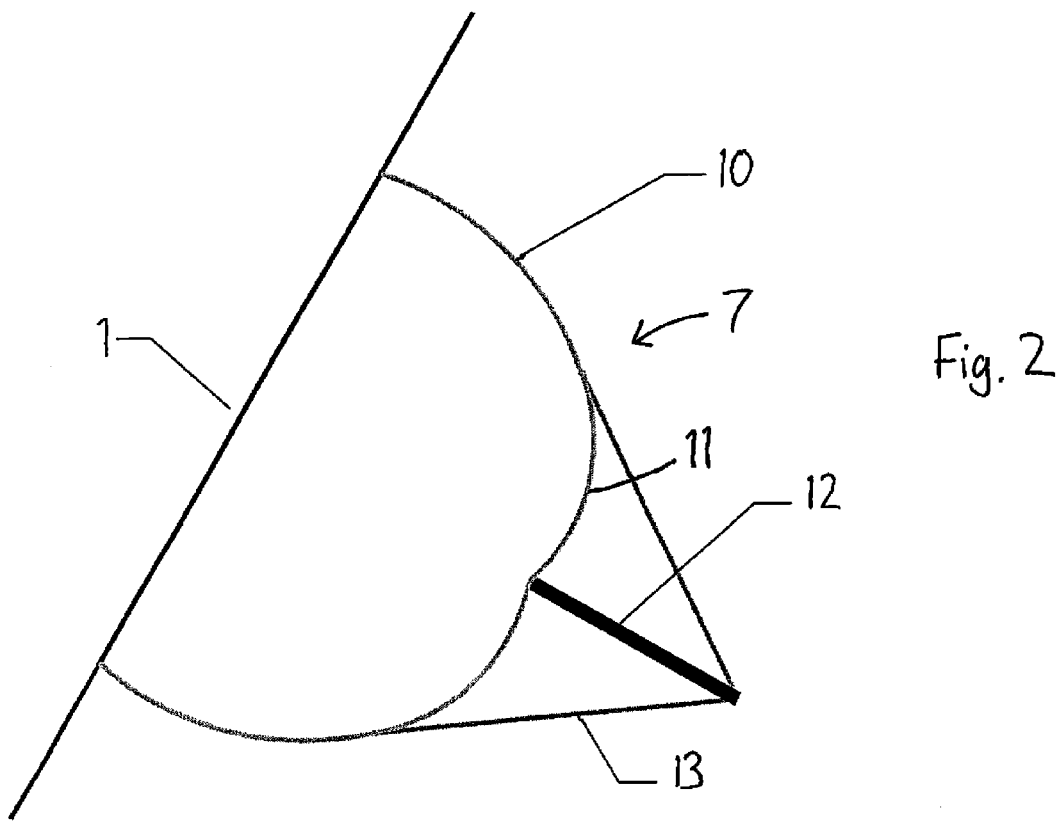
FIG. 2 is a schematic sectional view of a strake of the vehicle of FIG. 1.

As shown in FIG. 2, the strake 7 includes a low (i.e. ballonet) pressure air tube 10, formed partly from part of the flexible sheet forming the hull 1 and partly from a further flexible sheet 11 that is generally semicircular in cross-section.

The sheets 1, 11 are reinforced sheet material, e.g. a high strength laminated fabric.

A rigid board 12 of foamed plastics material extends outwardly from the centre of the tube 10. An outer flexible sheet 13, of similar material to the sheets 1, 11, is pre-integrated into the hull on either side of the strake 7 and stretched over the board 12 to provide a strake 7 of generally triangular cross-section.

Rigid board 12 has opposing edges, one of which bears against elongated tube 11 and the other bearing against flexible sheet 13. Typically, rigid board 12 is in compression and flexible sheet 13 is in tension when the hull 1 and elongated tube 10 are filled with gas at typical operating pressures.

The strake of the invention is particularly effective in improving aerodynamic stability in a flexible-hulled hybrid air vehicle.

An air vehicle may comprise a gas-filled hull 1 of flexible sheet material, wherein strakes 7 extend along an exterior of the hull 1, each strake 7 comprising a gas-filled tube 10 of flexible sheet material. The tube 10 may be filled with air. A part of a periphery of the tube 1 may be provided by the flexible sheet material of the hull 1 of the vehicle. The air vehicle may include a rigid board 12, projecting outwardly from the gas-filled tube 10 and away from the vehicle, a further layer 13 of flexible sheet material extending from one side of the strake 7 over the board 12 to another side of the strake 7, to provide a strake 7 generally triangular in cross section. The hull 1 may be contoured and flattened, and may include a pair of longitudinally extending side lobes 6 defining, on an underside of the hull 1, a longitudinally extending central recess, and a payload module 4 may be received in the central recess. Each strake 7 may extend from a vicinity of a forward motor 8 of the vehicle to a vicinity of a stabilizing fin 9 of the vehicle.

An air vehicle may comprise: a gas-filled hull 1 formed of flexible sheet material, first and second strakes 7 extend along opposite sides of an exterior of the hull 1, each strake 7 may comprise: an elongated gas-filled tube 10 of flexible sheet material adjacent the hull 1 of the vehicle, a rigid board 12 abutting and projecting outwardly from the gas-filled tube 10 and away from the hull 1 of the vehicle, and a further layer 13 of flexible sheet material extending from one side of the elongated gas-filled tube 10 over an edge of the rigid board 12 to another side of the elongated gas-filled tube 10, thereby to define a strake 7 having a generally triangular cross section. The flexible sheet material may include a reinforced sheet material, a high strength laminated fabric, or both reinforced sheet material and high strength laminated fabric. Each strake 7 may extend rearwardly on the vehicle from a forward motor 8 of the vehicle to a vicinity of a forward edge of a stabilizing fin 9 of the vehicle. The flexible sheet material of the hull 1 of the vehicle may provide part of a periphery of the elongated gas-filled tube of the strake 7. The hull 1 may be contoured and flattened so as to be wider than it is in height, the hull 1 may include a pair of elongated side lobes 6 extending longitudinally along the hull 1 to define, on an underside of the hull 1, a longitudinally extending central recess between the side lobes, the air vehicle further including a payload module 4 or a fuel module 5 or a payload module 4 and a fuel module 5 disposed in the central recess.

An air vehicle may comprise: a gas-filled hull 1 formed of flexible sheet material, first and second strakes 7 extend along opposite sides of an exterior of the hull 1, and each strake 7 may comprise: an elongated gas-filled tube 10 of flexible sheet material adjacent the hull 1 of the vehicle, a rigid board 12 having first and second opposing edges, with the first edge of the rigid board 12 disposed abutting and projecting outwardly from the gas-filled tube 10 and away from the hull 1 of the vehicle, and a further layer 13 of flexible sheet material extending from one side of the elongated gas-filled tube 10 over the second edge of the rigid board 12 to another side of the elongated gas-filled tube 10, thereby to define a strake 7 having a generally triangular cross section, wherein the rigid board 12 is in compression and the further layer 13 of flexible sheet material is in tension when the hull 1 and the elongated tube 10 of flexible sheet material are filled with gas. The flexible sheet material may include a reinforced sheet material, a high strength laminated fabric, or both reinforced sheet material and high strength laminated fabric. Each of the first and second strakes 7 may extend rearwardly on the hull 1 of the vehicle from a forward motor 8 of the vehicle to a vicinity of a forward edge of a stabilizing fin 9 of the vehicle. The flexible sheet material of the hull 1 of the vehicle may provide part of a periphery of the elongated gas-filled tube 10 of the strake 7. The hull 1 may be contoured and flattened so as to be wider than it is in height, the hull 1 may include a pair of elongated side lobes 6 extending longitudinally along the hull 1 to define, on an underside of the hull 1, a longitudinally extending central recess between the side lobes 6, the air vehicle further including a payload module 4 or a fuel module 5 or a payload module 4 and a fuel module 5 disposed in the central recess.

The invention claimed is:

1. An air vehicle having a gas-filled hull of a first flexible sheet, wherein a plurality of strakes extend along an exterior of the hull, each strake comprising:
    a gas-filled tube of a further flexible sheet,
    a rigid board, projecting outwardly from the gas-filled tube and away from the air vehicle, and
    an outer flexible sheet extending from one side of the gas-filled tube over the board to another side of the gas-filled tube,
    wherein each strake has a generally triangular cross section.

2. An air vehicle according to claim 1, wherein the tube is filled with air.

3. An air vehicle according to claim 1, wherein a part of a periphery of the gas-filled tube is provided by the first flexible sheet of the hull of the air vehicle.

4. An air vehicle according to claim 1, wherein the hull is contoured and flattened, and includes a pair of longitudinally extending side lobes defining, on an underside of the hull, a longitudinally extending central recess.

5. An air vehicle according to claim 1, wherein each strake extends from a vicinity behind a forward motor of the air vehicle to a vicinity a forward edge of a stabilizing fin of the air vehicle.

6. An air vehicle comprising:
    a gas-filled hull formed of a first flexible sheet,
    first and second strakes extending along opposite sides of an exterior of the hull,
    each strake comprising:
        an elongated gas-filled tube of a further flexible sheet adjacent the hull of the air vehicle,
        a rigid board abutting and projecting outwardly from the gas-filled tube and away from the hull of the air vehicle, and
        an outer flexible sheet extending from one side of the_elongated gas-filled tube over an edge of the rigid board to another side of the elongated gas-filled tube, thereby to define each strake as having a generally triangular cross section.

7. An air vehicle according to claim 6, wherein the first flexible sheet, the further flexible sheet and the outer flexible sheet include a reinforced sheet material, a high strength laminated fabric, or both reinforced sheet material and high strength laminated fabric.

8. An air vehicle according to claim 6, wherein each strake extends rearwardly on the air vehicle from a forward motor of the air vehicle to a vicinity of a forward edge of a stabilizing fin of the air vehicle.

9. An air vehicle according to claim 6, wherein the first flexible sheet of the hull of the air vehicle provides part of a periphery of the elongated gas-filled tube of the strake.

10. An air vehicle according to claim 6, wherein the hull is contoured and flattened so as to have a width and to have a height that is less than the width, the hull including a pair of elongated side lobes extending longitudinally along the hull to define, on an underside of the hull, a longitudinally extending central recess between the side lobes.

11. An air vehicle comprising:
    a gas-filled hull formed of a first flexible sheet,
    first and second strakes extending along opposite sides of an exterior of the hull,
    each strake comprising:
        an elongated gas-filled tube of a further flexible sheet adjacent the hull of the air vehicle,
        a rigid board having first and second opposing edges, with the first edge of the rigid board disposed abutting and projecting outwardly from the gas-filled tube and away from the hull of the air vehicle, and
        an outer flexible sheet extending from one side of the elongated gas-filled tube over the second edge of the rigid board to another side of the elongated gas-filled tube, thereby to define each strake as having a generally triangular cross section,
    wherein the rigid board is in compression and the outer flexible sheet is in tension when the hull and the elongated tube are filled with gas.

12. An air vehicle according to claim 11, wherein the first flexible sheet, the further flexible sheet and the outer flexible sheet include a reinforced sheet material, a high strength laminated fabric, or both reinforced sheet material and high strength laminated fabric.

13. An air vehicle according to claim 11, wherein each of the first and second strakes extends rearwardly on the hull of the air vehicle from a forward motor of the air vehicle to a vicinity of a forward edge of a stabilizing fin of the air vehicle.

14. An air vehicle according to claim 11, wherein the flexible sheet material of the hull of the air vehicle provides part of a periphery of the elongated gas-filled tube of the strake.

15. An air vehicle according to claim 11, wherein the hull is contoured and flattened so as to have a width and to have a height that is less than the width, the hull including a pair of elongated side lobes extending longitudinally along the hull to define, on an underside of the hull, a longitudinally extending central recess between the side lobes.

16. An air vehicle according to claim 15, further including: a payload module or a fuel module or both a payload module and a fuel module disposed in the central recess.

17. An air vehicle according to claim 4, further including: a payload module or a fuel module or both a payload module and a fuel module disposed in the central recess.

18. An air vehicle according to claim 10, further including: a payload module or a fuel module or both a payload module and a fuel module disposed in the central recess.

* * * * *